US010995286B2

(12) United States Patent
Gatt et al.

(10) Patent No.: US 10,995,286 B2
(45) Date of Patent: May 4, 2021

(54) CATALYTIC DEWAXING OF HYDROCARBON FEEDSTOCKS

(71) Applicant: ExxonMobil Research and Engineering Company, Annandale, NJ (US)

(72) Inventors: Joseph E. Gatt, Annandale, NJ (US); William W. Lonergan, Humble, TX (US); Scott J. Weigel, Allentown, PA (US); Ivy D. Johnson, Lawrenceville, NJ (US); Karl G. Strohmaier, Port Murray, NJ (US); Simon C. Weston, Annandale, NJ (US)

(73) Assignee: EXXONMOBIL RESEARCH AND ENGINEERING COMPANY, Annandale, NJ (US)

(*) Notice: Subject to any disclaimer, the term of this patent is extended or adjusted under 35 U.S.C. 154(b) by 0 days.

(21) Appl. No.: 16/709,205

(22) Filed: Dec. 10, 2019

(65) Prior Publication Data

US 2020/0199468 A1  Jun. 25, 2020

Related U.S. Application Data

(60) Provisional application No. 62/783,433, filed on Dec. 21, 2018.

(51) Int. Cl.
C10G 73/34 (2006.01)
C10G 45/64 (2006.01)
B01J 29/70 (2006.01)

(52) U.S. Cl.
CPC ........... *C10G 73/34* (2013.01); *C10G 45/64* (2013.01); *B01J 29/70* (2013.01)

(58) Field of Classification Search
None
See application file for complete search history.

(56) References Cited

U.S. PATENT DOCUMENTS

| | | | |
|---|---|---|---|
| 3,668,113 A | 6/1972 | Burbridge et al. |
| 3,894,938 A | 7/1975 | Gorring et al. |
| 3,923,641 A | 12/1975 | Morrison |
| 4,176,050 A | 11/1979 | Chen et al. |
| 4,181,598 A | 1/1980 | Gillespie |
| 4,222,855 A | 9/1980 | Pelrine et al. |
| 4,229,282 A | 10/1980 | Peters et al. |
| 4,247,388 A | 1/1981 | Banta et al. |
| 4,259,174 A | 3/1981 | Chen et al. |
| 4,419,220 A | 12/1983 | LaPierre et al. |
| 4,501,926 A | 2/1985 | LaPierre et al. |

(Continued)

FOREIGN PATENT DOCUMENTS

FR  2756295 A1  5/1998
WO  2019/022908 A1  1/2019

OTHER PUBLICATIONS

Bennett et al., "New process produces low-pour oils", Oil & Gas Journal 73 (1975), pp. 69-73.

*Primary Examiner* — Tam M Nguyen
(74) *Attorney, Agent, or Firm* — Robert A. Migliorini

(57) ABSTRACT

In a process for improving the cold flow properties of a hydrocarbon feedstock, the feedstock is contacted with a catalyst composition comprising an EMM-17 molecular sieve and a hydrogenation component under dewaxing conditions effective to produce a dewaxed product having a cloud point and/or pour point that is reduced relative to the cloud point and/or pour point of the feedstock by at least 5° C.

18 Claims, 4 Drawing Sheets

(56) References Cited

U.S. PATENT DOCUMENTS

| | | |
|---|---|---|
| 5,108,579 A | 4/1992 | Casci |
| 9,452,423 B2 | 9/2016 | Weston et al. |
| 2014/0262945 A1 | 9/2014 | Dindi et al. |
| 2016/0368778 A1 | 12/2016 | Weston et al. |

CATALYTIC DEWAXING OF HYDROCARBON FEEDSTOCKS

CROSS-REFERENCE TO RELATED APPLICATIONS

This application claims priority to U.S. Provisional Application No. 62/783,433 filed Dec. 21, 2018, which is herein incorporated by reference in its entirety.

FIELD

This disclosure relates to catalytic dewaxing of hydrocarbon feedstocks.

BACKGROUND

Most lubricating oil feedstocks must be dewaxed in order to manufacture finished products which will remain fluid down to the lowest temperature of use. Dewaxing is the process of separating or converting hydrocarbons which solidify readily (e.g., waxes) in petroleum fractions. Processes for dewaxing petroleum distillates have been known for a long time. As used herein, dewaxing means a reduction in a least some of the normal paraffin content of the feed. The reduction may be accomplished by isomerization of n-paraffins or naphthenic molecules and/or cracking, or hydrocracking.

Dewaxing is required when highly paraffinic oils are to be used in products which need to flow at low temperatures, i.e., lubricating oils, heating oil, diesel fuel, and jet fuel. These oils contain high molecular weight straight chain and slightly branched paraffins which cause the oils to have high pour points and cloud points and, for jet fuels, high freeze points. In order to obtain adequately low pour points, these waxes must be wholly or partly removed or converted. In the past, various solvent removal techniques were used, such as MEK (methyl ethyl ketone-toluene solvent) dewaxing, which utilizes solvent dilution, followed by chilling to crystallize the wax, and filtration.

The decrease in demand for petroleum waxes as such, together with the increased demand for gasoline and distillate fuels, has made it desirable to find processes which not only remove the waxy components but which also convert these components into other materials of higher value. Catalytic dewaxing processes achieve this end by either of two methods or a combination thereof. The first method requires the selective cracking of the longer chain n-paraffins, to produce lower molecular weight products which may be removed by distillation. Processes of this kind are described, for example, in The Oil and Gas Journal, Jan. 6, 1975, pages 69 to 73 and U.S. Pat. No. 3,668,113. The second method requires the isomerization of straight chain paraffins and substantially straight chain paraffins with minimal branching to more branched species. Processes of this kind are described in U.S. Pat. Nos. 4,419,220 and 4,501,926.

To date, there have been a number of methods developed for dewaxing hydrocarbon feeds. Many dewaxing processes that are presently being used reduce the pour and cloud point of a hydrocarbon stream to acceptable levels at the price of producing more than a desirable amount of naphtha and light gas. An ideal economic fuel dewaxing process would reduce the cloud point or pour point of the feed to acceptable levels while maximizing the yields of diesel fuel and heating oil and minimizing the yields of naphtha and light gas. Previous dewaxing processes have utilized zeolite hydrodewaxing catalysts including ZSM-5, ZSM-11, ZSM-12, ZSM-20, ZSM-22, ZSM-23, ZSM-34, ZSM-35, ZSM-38, ZSM-48, ZSM-50, mordenite, SAPO-11, and zeolite beta.

In order to obtain the desired selectivity, many previously known processes have used a zeolite catalyst having a pore size which admits the straight chain n-paraffins, either alone or with only slightly branched chain paraffins, but which excludes more highly branched materials, cycloaliphatics and aromatics. Zeolites such as ZSM-5, ZSM-11, ZSM-12, ZSM-23, ZSM-35 and ZSM-38 have been proposed for this purpose in dewaxing processes and their use is described in U.S. Pat. Nos. 3,894,938; 4,176,050; 4,181,598; 4,222,855; 4,229,282; and 4,247,388. A dewaxing process employing synthetic offretite is described in U.S. Pat. No. 4,259,174. A hydrocracking process employing zeolite beta as the acidic component is described in U.S. Pat. No. 3,923,641.

A new generation of dewaxing catalysts needs to be developed which improve upon both the dewaxing activity and selectivity of the currently available technology and which are effective over a broad range of applications and feedstocks, including both sweet and sour feeds.

SUMMARY

According to the present disclosure, it has now been found that the recently discovered molecular sieve material, known as EMM-17, exhibits unusually high activity and selectivity for the catalytic dewaxing of hydrocarbon feeds including naphtha, distillate, VGO, and lubes.

Thus, in one aspect, the present disclosure relates to a process for improving the cold flow properties of a hydrocarbon feedstock, the process comprising: contacting the feedstock with a catalyst composition comprising an EMM-17 molecular sieve and a hydrogenation component under dewaxing conditions effective to produce a dewaxed product having a cloud point and/or pour point that is reduced relative to the cloud point and/or pour point of the feedstock by at least 5° C.

DETAILED DESCRIPTION OF THE EMBODIMENTS

Figure 1:
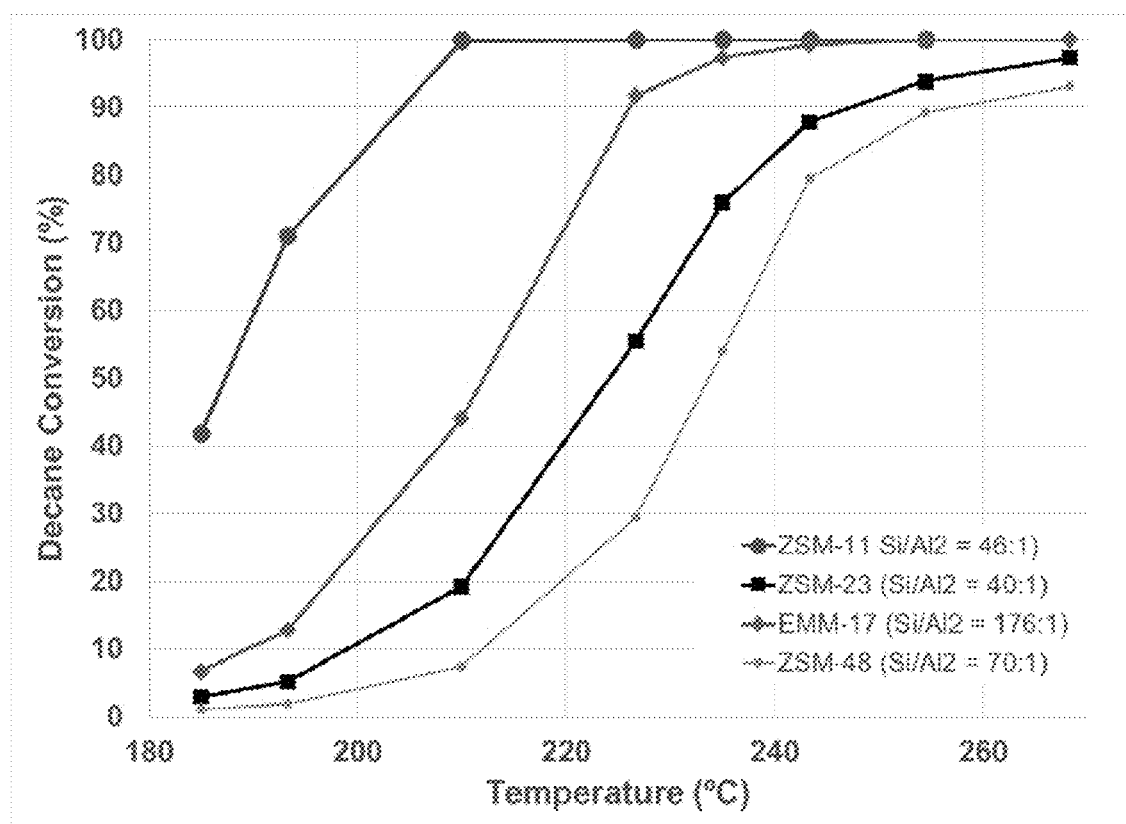
FIG. 1 is a line graph of n-decane conversion against temperature for the EMM-17 and known dewaxing catalysts employed in Example 3.

Described herein is a process for improving the cold flow properties of a hydrocarbon feedstock. The process comprises contacting the feedstock with a catalyst composition comprising an EMM-17 molecular sieve and a hydrogenation component under dewaxing conditions, such as those effective to hydroisomerize n-alkanes in the feedstock, to produce a dewaxed product having a cloud point and/or pour point that is reduced relative to the cloud point and/or pour point of the feedstock by at least 5° C. All cloud point values referred to herein are as measured in accordance with ASTM D5773 and all pour point values are as measured in accordance with ASTM D5949.

It is found that dewaxing catalysts containing EMM-17 exhibit significantly higher activity with comparable selectivity to current state of the art dewaxing catalysts across a broad range of conditions and applications. For distillate applications, this activity benefit can be seen in sweet applications (<10 ppm S, N) where EMM-17 based catalysts exhibit 30° F. higher activity with comparable selectivity. This benefit can manifest itself commercially by allowing for higher space velocities, lower catalyst loads, lower operating temperatures, or waxier feeds to be processed. EMM-17 dewaxing catalysts also provide significant benefits for sour service distillate dewaxing. In head to head comparisons with leading commercial dewaxing catalysts, EMM-17 exhibits 30 to 60° F. higher activity with comparable isomerization selectivity in feeds containing up to 1.5 wt. % S and 500 ppm N. This higher activity results in equivalent to slightly more distillate yield loss at equivalent delta cloud basis when compared to current leading dewaxing catalysts. The relative activity with equivalent to near equivalent selectivity allows for successful application in both trim and deep dewaxing applications. In trim dewaxing applications (<20° F. delta cloud), the additional activity with comparable selectivity allows for drop-in solutions to existing hydrotreating units with minimal impact to the hydrotreater since minimal catalyst would need to be displaced to achieve target cloud point improvements. It would also enable a larger application space, as many existing hydrotreaters have start of run temperatures that are lower than the operating window of current state of the art dewaxing catalysts. In deep dewaxing applications, the additional activity allows for higher delta clouds with reasonable catalyst load sizes, or operating space velocities and temperatures in comparison to conventional commercial dewaxing catalysts. Both applications allow for additional crude flexibility, the ability to process feeds with higher endpoints or waxier content and to dewax feeds with higher S or N content.

Catalyst Composition

The catalyst composition employed in the present process comprises, as an active component, the molecular sieve EMM-17. In its calcined form, EMM-17 is characterized by an X-ray diffraction pattern which includes at least the peaks shown below in Table 1 and in its as-synthesized form, by an X-ray diffraction pattern which includes at least the peaks shown below in Table 2.

TABLE 1

| d-spacing (Å) | Relative Intensity [100 × I/I(o)]% |
|---|---|
| 17.4-16.4 | 1-10 |
| 12.6-12.1 | 1-20 |
| 11.8-11.4 | 60-100 |
| 11.2-10.8 | 5-30 |
| 10.7-10.3 | 30-80 |
| 8.62-8.38 | 10-40 |
| 6.09-5.96 | 1-20 |
| 5.71-5.61 | 1-20 |

TABLE 1-continued

| d-spacing (Å) | Relative Intensity [100 × I/I(o)]% |
|---|---|
| 4.23-4.17 | 1-20 |
| 4.09-4.03 | 1-10 |
| 3.952-3.901 | 10-40 |
| 3.857-3.809 | 5-30 |
| 3.751-3.705 | 1-20 |
| 3.727-3.682 | 1-20 |
| 3.689-3.644 | 1-10 |
| 3.547-3.506 | 1-20 |

TABLE 2

| d-spacing (Å) | Relative Intensity [100 × I/I(o)]% |
|---|---|
| 17.3-16.4 | 1-10 |
| 11.8-11.3 | 60-100 |
| 11.1-10.7 | 60-100 |
| 10.7-10.3 | 30-100 |
| 8.58-8.34 | 30-80 |
| 4.21-4.15 | 10-40 |
| 4.17-4.11 | 5-30 |
| 4.07-4.01 | 10-40 |
| 3.951-3.899 | 60-100 |
| 3.922-3.871 | 10-40 |
| 3.832-3.784 | 50-90 |
| 3.737-3.691 | 10-40 |
| 3.704-3.659 | 10-40 |
| 3.677-3.632 | 5-30 |
| 3.537-3.496 | 10-40 |
| 2.077-2.063 | 5-30 |

The X-ray diffraction data reported herein were collected with a PANalytical X-Pert Pro diffraction system, equipped with an X'Celerator detector, using copper K-alpha radiation and a fixed 0.25 degrees divergence slit. The diffraction data were recorded by step-scanning at 0.017 degrees of two-theta, where theta is the Bragg angle, and a counting time of 20 seconds for each step. The interplanar spacings, d-spacings, were calculated in Angstrom units, and the relative peak area intensities of the lines, I/I(o) is one-hundredth of the intensity of the strongest line, above background, were determined with the MDI Jade peak profile fitting algorithm. The intensities are uncorrected for Lorentz and polarization effects. It should be understood that diffraction data listed for this sample as single lines may consist of multiple overlapping lines which under certain conditions, such as differences in crystallographic changes, may appear as resolved or partially resolved lines. Typically, crystallographic changes can include minor changes in unit cell parameters and/or a change in crystal symmetry, without a change in the structure. These minor effects, including changes in relative intensities, can also occur as a result of differences in cation content, framework composition, nature and degree of pore filling, crystal size and shape, preferred orientation and thermal and/or hydrothermal history.

The molecular sieve material EMM-17, in its as-calcined form, has a chemical composition having the following molar relationship:

$$X_2O_3:(n)YO_2$$

wherein n is at least about 30, such as about 30 to about 500, X is a trivalent element, such as one or more of B, Al, Fe, and Ga, and Y is a tetravalent element, such as one or more of Si, Ge, Sn, Ti, and Zr. It will be appreciated from permitted values for n that EMM-17 can be synthesized in an all siliceous form, in which the trivalent element X is absent or effectively absent. In some embodiments, especially where the molecular sieve material is an aluminosilicate, preferred forms of EMM-17 for use in the present process have an n value of at least 50, such as at least 100, such as at least 150.

In its as-synthesized form, the molecular sieve EMM-17 has a chemical composition having the following molar relationship:

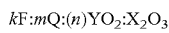

$kF:mQ:(n)YO_2:X_2O_3$ wherein $0 \leq k < 1.0$, $0 < m \leq 1.0$, n is at least 30, F is fluoride, Q is an organic structure directing agent, X is a trivalent element, such as one or more of B, Al, Fe, and Ga, and Y is a tetravalent element, such as one or more of Si, Ge, Sn, Ti, and Zr.

In embodiments, suitable examples of the organic structure directing agent Q include 1-methyl-4-(pyrrolidin-1-yl) pyridinium cations, 1-ethyl-4-(pyrrolidin-1-yl)pyridinium cations, 1-propyl-4-(pyrrolidin-1-yl)pyridinium cations, 1-butyl-4-(pyrrolidin-1-yl)pyridinium cations, and mixtures thereof.

The Q and F components, which are associated with the as-synthesized form of molecular sieve EMM-17 as a result of their presence during crystallization, may be easily removed by conventional post-crystallization methods.

EMM-17 can be prepared from a synthesis mixture comprising a source of water, a source of hydroxyl ions, an oxide of a tetravalent element Y, optionally a trivalent element X, optionally a source fluoride ions F, and a directing agent Q described above. The synthesis mixture may have a composition, in terms of mole ratios of oxides, within the following amounts

| Reactants | Useful | Preferred |
|---|---|---|
| $YO_2/X_2O_3$ | at least 30 | 30 to 200 |
| $H_2O/YO_2$ | 1 to 20 | 4 to 10 |
| $OH^-/YO_2$ | 0.1 to 1 | 0.3 to 0.7 |
| $F^-/YO_2$ | 0.1 to 1 | 0.3 to 0.7 |
| $Q/YO_2$ | 0.1 to 1 | 0.3 to 0.7 |

Suitable sources of tetravalent element Y depend on the element Y that is selected (e.g., silicon, germanium, strontium, titanium and zirconium). In embodiments where Y is silicon, suitable sources of silicon include colloidal suspensions of silica, precipitated silica, alkali metal silicates, and tetraalkyl orthosilicates. In embodiments where Y is germanium, germanium oxide may be used as an oxide source.

If present, suitable sources of trivalent element X depend on the element X that is selected, e.g. boron, aluminum, iron, titanium, and gallium. In embodiments where X is aluminum, sources of aluminum include hydrated alumina, zeolites, clays, and water-soluble aluminum salts, such as aluminum nitrate.

If present, suitable sources of fluoride ions include HF, $NH_4F$ and $NH_4HF_2$.

Suitable sources of the directing agent Q include the hydroxides and/or salts of the relevant quaternary ammonium compounds. 1-Methyl-4-(pyrrolidin-1-yl)pyridinium compounds can be readily synthesized by the reaction of 4-(pyrrolidin-1-yl)pyridine with iodomethane. 1-Ethyl-4-(pyrrolidin-1-yl)pyridinium compounds can be readily synthesized by the reaction of 4-(pyrrolidin-1-yl)pyridine with iodoethane. 1-Propyl-4-(pyrrolidin-1-yl)pyridinium compounds can be readily synthesized by the reaction of 4-(pyrrolidin-1-yl)pyridine with 1-iodopropane. 1-Butyl-4-(pyrrolidin-1-yl)pyridinium compounds can be readily synthesized by the reaction of 4-(pyrrolidin-1-yl)pyridine with 1-iodobutane.

Crystallization of EMM-17 can be carried out at either static or stirred conditions in a suitable reactor vessel, such as for example, polypropylene jars or Teflon lined or stainless steel autoclaves, at a temperature of about 100° C. to about 200° C., such as about 150° C. to about 170° C., for a time sufficient for crystallization to occur at the temperature used, e.g., from about 1 day to about 30 days, for example about 2 days to about 20 days. Thereafter, the synthesized crystals are separated from the liquid and recovered.

The synthesis may be aided by seeds from a previous synthesis of EMM-17, with the seeds suitably being present in an amount from about 0.01 ppm by weight to about 10,000 ppm by weight, such as from about 100 ppm by weight to about 5,000 ppm by weight of the synthesis mixture.

The as-synthesized EMM-17 may be subjected to treatment to remove a portion of, or the entire amount of, the organic directing agent Q used in its synthesis. This is conveniently done by thermal treatment (calcination) in which the as-synthesized material is heated at a temperature of at least about 370° C. for at least 1 minute and generally not longer than 20 hours. While subatmospheric pressure can be employed for the thermal treatment, atmospheric pressure is desired for reasons of convenience. The thermal treatment can be performed at a temperature up to about 925° C. The calcination could also be done in the presence of ozone.

Further details of EMM-17 and its synthesis can be found in U.S. Pat. Nos. 9,452,423 and 9,890,050 and in PCT Application No. PCT/US2018/039899, the entire disclosure of which is incorporated herein by reference.

In addition to the molecular sieve EMM-17, the catalyst composition employed in the present process includes at least one hydrogenation component. Suitable hydrogenation components comprise metals and compounds thereof from Groups 6-12 of the Periodic Table based on the IUPAC system having Groups 1-18, preferably from Groups 6 and 8-10. Examples of such metals include Ni, Mo, Co, W, Mn, Cu, Zn, Ru, Pt or Pd, preferably Pt or Pd. Mixtures of hydrogenation metals may also be used, such as Co/Mo, Ni/Mo, Ni/W and Pt/Pd. Depending on the metal(s) used, the amount of hydrogenation metal or metals may range from 0.01 to 50 wt. %, such as 0.1 to 30 wt %, based on the total weight of the catalyst composition. Methods of loading metal onto the catalyst are well known and include, for example, impregnation of the EMM-17 molecular sieve with a metal salt of the desired hydrogenation component and heating to form the metal oxide. The catalyst composition containing the hydrogenation component may be sulfided prior to use. The catalyst composition containing the hydrogenation component may be reduced prior to use. The catalyst may also be steamed prior to use.

The catalyst composition employed in the present process may be binder-free, but typically is combined with a binder or matrix material prior to use. Binders are resistant to the temperatures of the use desired and are attrition resistant. Binders may be catalytically active or inactive and can include other zeolites, other inorganic materials, such as clays, perovskites, spinels, and metal oxides, such as alumina, titania, cerium oxide, lanthanum oxide, silica and silica-alumina. Clays may be kaolin, bentonite and montmorillonite and are commercially available. They may be blended with other materials such as silicates. Other porous matrix materials in addition to silica-aluminas include other binary materials such as silica-magnesia, silica-thoria, silica-zirconia, silica-beryllia and silica-titania as well as ternary materials such as silica-alumina-magnesia, silica-alumina-thoria and silica-alumina-zirconia. The matrix can be in the form of a co-gel. Where present, the binder may comprise at least 5 wt. %, such as from 5 to 90 wt. % of the total catalyst composition.

In some embodiments, the EMM-17-containing catalyst, with or without binder, may be subjected to treatment to modify, preferably reduce, the aluminum content of the crystal and/or move Al around in the catalyst. Suitable treatments include steaming, acid washing (low pH, mineral acids, carboxylic acids, dicarboxylic acids), base washing (moderate to high pH, alkali metal hydroxides, quaternary ammonium hydroxides including $NH_4OH$, alkali metal carbonates and bicarbonates), and treatment with hexafluorosilicate salts ($X_2SiF_6$, where X=H, alkali metal, quaternary ammonium including $NH_4$). The preferred treatment comprises steaming under conditions to reduce the crystalline aluminum content. Such conditions are well known in the art.

Additionally or alternatively, mesoporosity may be introduced into the EMM-17-containing catalyst by any process known in the art, for example, by steaming, by post modification with surfactants, by desilication and other chemical treatments and/or by control of peptizing agents in the extrusion process.

Feedstocks

The EMM-17 containing catalyst composition described above can be used to improve the cold flow properties of any hydrocarbon feedstock containing n-alkanes, including naphtha, distillate, VGO and lubricant basestocks.

In one embodiment, the hydrocarbon feedstock comprises a distillate fraction having an initial boiling point of at least 95° C., such as at least about 115° C., for example at least about 140° C. or at least about 170° C. and a final boiling point of about 455° C. or less, or about 440° C. or less, or about 425° C. or less.

In another embodiment, the hydrocarbon feedstock comprises a lubricant basestock having an initial boiling point of at least 220° C. and a final boiling point up to 650° C. Suitable lubricant feeds may be derived from a number of sources such as oils derived from solvent refining processes such as raffinates, partially solvent dewaxed oils, deasphalted oils, distillates, vacuum gas oils, coker gas oils, slack waxes, foots oils and the like, and Fischer-Tropsch waxes. Preferred feeds are slack waxes and Fischer-Tropsch waxes. Slack waxes are typically derived from hydrocarbon feeds by solvent or propane dewaxing. Slack waxes contain some residual oil and are typically deoiled. Foots oils are derived from deoiled slack waxes. Fischer-Tropsch waxes are prepared by the Fischer-Tropsch synthetic process.

The present process can be used with feedstocks which contain a wide range of heteroatom impurities, from "sweet" feeds containing no more than 10 ppm by weight of nitrogen and/or sulfur to "sour" feeds containing up to 2.0 wt. % sulfur and up to 500 ppm by weight nitrogen. Sulfur and nitrogen contents may be measured by standard ASTM methods D5453 and D4629, respectively.

Dewaxing Process

Suitable dewaxing conditions for use with the EMM-17 containing catalyst described above may include a temperature of from 200 to 450° C., preferably 260 to 400° C., a hydrogen partial pressure of from 1.4 MPag to 34.6 MPag (200 psig to 5000 psig), preferably 4.8 MPag to 20.7 MPag, and a hydrogen to feed ratio of from 35.6 $m^3/m^3$ (200 SCF/B) to 1781 $m^3/m^3$ (10,000 scf/B), preferably 178 $m^3/m^3$ (1000 SCF/B) to 890.6 $m^3/m^3$ (5000 SCF/B). In still other embodiments, the conditions can include temperatures in the range of 600° F. (343° C.) to 815° F. (435° C.), hydrogen partial pressures of from 500 psig to 3000 psig (3.6 MPag to 20.7 MPag), and hydrogen to feed ratio of from 213 $m^3/m^3$ to 1068 $m^3/m^3$ (1200 SCF/B to 6000 SCF/B). These latter conditions may be suitable, for example, if the dewaxing process is operating under sour conditions. The liquid hourly space velocity (LHSV) can be from 0.2 $hr^{-1}$ to 10 $hr^{-1}$, such as from 0.5 $hr^{-1}$ to 5 $hr^1$ and/or from 1 $hr^{-1}$ to 4 $hr^1$.

In some embodiments, the feedstocks may be hydrotreated prior to dewaxing to reduce at least one of the sulfur, nitrogen or aromatic content of the feedstock. Suitable hydrotreating catalysts are those containing Group 6 metals (based on the IUPAC Periodic Table format having Groups from 1 to 18), Group 8-10 metals, and mixtures thereof. Preferred metals include nickel, tungsten, molybdenum, cobalt and mixtures thereof. These metals or mixtures of metals are typically present as oxides or sulfides on refractory metal oxide supports. The mixture of metals may also be present as bulk metal catalysts wherein the amount of metal is 30 wt. % or greater, based on catalyst. Suitable metal oxide supports include oxides such as silica, alumina, silica-aluminas or titania, preferably alumina. Preferred aluminas are porous aluminas such as gamma or eta. The amount of metals, either individually or in mixtures, ranges from about 0.5 to 35 wt. %, based on the catalyst. In the case of preferred mixtures of Group 9-10 metals with Group 6 metals, the Group 9-10 metals may be present in amounts of from 0.5 to 5 wt. %, based on catalyst and the Group 6 metals may be present in amounts of from 5 to 30 wt. % again based on the catalyst.

Hydrotreating conditions may include temperatures of up to 426° C., preferably from 150 to 400° C., more preferably 200 to 350° C., a hydrogen partial pressure of from 1480 to 20786 kPa (200 to 3000 psig), preferably 2859 to 13891 kPa (400 to 2000 psig), a space velocity of from 0.1 to 10 $hr^{-1}$, preferably 0.1 to 5 $hr^{-1}$, and a hydrogen to feed ratio of from 89 to 1780 $m^3/m^3$ (500 to 10000 scf/B), preferably 178 to 890 $m^3/m^3$.

The hydrotreating may be conducted in the same reactor as, or in a separate reactor from, the reaction zone used to conduct dewaxing. In an integrated set-up (dewaxing being conducted in the hydrotreater) the additional activity of EMM-17 allows for minimal hydrotreating catalyst to be displaced. In a separate reactor, the activity allows for either a smaller reactor, running at lower temperatures, or throughput advantages. Si/Al ratios and activity can be tailored to the specific application.

In the case of lubricant feeds, the dewaxed basestock may be hydrofinished. Hydrofinishing is a form of mild hydrotreating directed to saturating any lube range olefins and residual aromatics as well as to removing any remaining heteroatoms and color bodies. The post dewaxing hydrofinishing is usually carried out in cascade with the dewaxing step. Generally the hydrofinishing will be carried out at temperatures from about 150° C. to 350° C., preferably 180° C. to 250° C. Total pressures are typically from 2859 to 20786 kPag (about 400 to 3000 psig). Liquid hourly space velocity is typically from 0.1 to 10 $hr^{-1}$, preferably 0.5 to 6 $hr^1$ and hydrogen to feed ratios of from 44.5 to 1780 $m^3/m^3$ (250 to 10,000 scf/B).

Hydrofinishing catalysts include those containing Group 6 metals (based on the IUPAC Periodic Table format having Groups from 1 to 18), Group 8-10 metals, and mixtures thereof. Preferred metals include at least one noble metal having a strong hydrogenation function, especially platinum, palladium and mixtures thereof. The mixture of metals may also be present as bulk metal catalysts wherein the amount of metal is 30 wt. % or greater based on catalyst. Suitable metal oxide supports include low acidity oxides such as silica, alumina, silica-aluminas or titania, preferably alumina. The preferred hydrofinishing catalysts for aromatics saturation will comprise at least one metal having relatively strong hydrogenation function on a porous support. Typical support materials include amorphous or crystalline oxide materials such as alumina, silica, and silica-alumina. The metal content of the catalyst is often as high as about 20 wt. % for non-noble metals. Noble metals are usually present in amounts no greater than about 1 wt. %.

A preferred hydrofinishing catalyst is a mesoporous material belonging to the M41S class or family of catalysts. The M41S family of catalysts are mesoporous materials having high silica contents whose preparation is further described in J. Amer. Chem. Soc., 1992, 114, 10834. Examples include MCM-41, MCM-48 and MCM-50. Mesoporous refers to materials having pore sizes from 15 to 100 Angstroms. A preferred member of this class is MCM-41 whose preparation is described in U.S. Pat. No. 5,098,684. MCM-41 is an inorganic, porous, non-layered phase having a hexagonal arrangement of uniformly-sized pores wherein the pore opening ranges from 15 to 100 Angstroms. MCM-48 has a cubic symmetry and is described for example in U.S. Pat. No. 5,198,203 whereas MCM-50 has a lamellar structure. MCM-41 can be made with different size pore openings in the mesoporous range. The mesoporous materials may bear a metal hydrogenation component, which is at least one of Group 8, Group 9 or Group 10 metals. Preferred are noble metals, especially Group 10 noble metals, most preferably Pt, Pd or mixtures thereof.

The present process will now be more particularly described with reference to the following non-limiting Examples and the accompanying drawings.

Example 1: Preparation of Aluminosilicate EMM-17 with a $SiO_2/Al_2O_3$, Ratio of about 200 Using 1-ethyl-4-(pyrrolidin-1-yl)pyridinium hydroxide A gel of stoichiometry: 0.5 HF: 0.5 SDA-OH: 0.005 $Al_2O_3:SiO_2$: 4 $H_2O$, where SDA-OH is 1-ethyl-4-(pyrrolidin-1-yl)pyridinium hydroxide, was prepared according to the following procedure. 12.6 g. tetramethylorthosilicate, 42.08 g of a 19.11 wt. % aqueous solution of 1-ethyl-4-(pyrrolidin-1-yl)pyridinium hydroxide, and 3.53 g of 5 wt. % aqueous solution of aluminum nitrate were combined and stirred for 15 minutes. 1.79 g of a 46.3 wt. % aqueous solution of hydrofluoric acid was then added. The resulting gel was stirred and left to evaporate to the desired water ratio. About one third of the evaporated gel was then transferred to a 23 ml Teflon lined autoclave and reacted in a tumbling (30-40 rpm) oven at 150° C. for 10 days. The resulting product was recovered by filtration, washed thoroughly with deionized water, and then dried at 100° C. in an oven. Phase analysis by powder X-ray diffraction showed the synthesized product to be EMM-17. The $SiO_2/Al_2O_3$ of the product was measured to be 164.

The EMM-17 product was mixed with Versal 300 alumina (65 wt. % zeolite/35 wt. % alumina) and water to a solids levels of 60 wt. %. The resultant mixture was extruded on a 1" Diamond America extruder and then dried at 250° F. (121° C.) overnight in a Despatch forced draft oven. The dried extrudate was calcined in nitrogen at 1000° F. (538° C.) for 3 hours, exchanged with 50 cc/g of 1 M $NH_4NO_3$ for 1 hour in a recirculation mode after which the exchange solution was refreshed and the exchange repeated a second time. The sample was washed overnight with water and dried at 250° F. (121° C.) for 24 hours. The extrudate was calcined in 5 volumes of air/volume of catalyst at 1020° F. (549° C.) for 4 hours to produce the acid form of the molecular sieve. The extrudate was then impregnated with platinum tetraamine nitrate to achieve a 0.6 wt. % Pt loading, equilibrated at ambient conditions, dried at 250° F. (121° C.) for 16 hours, and calcined in air at 680° F. (360° C.) for 3 hours to produce the platinum oxide version of the catalyst. The catalyst was then reduced in the unit used for catalytic testing to produce the active metal catalyst.

Example 2: Synthesis of Aluminosilicate EMM-17 with a $SiO_2/Al_2O_3$ Ratio of about 80 Using 1-ethyl-4-(pyrrolidin-1-yl)pyridinium hydroxide A gel of stoichiometry: 0.5 HF: 0.5 SDA-OH: 0.012 $Al_2O_3:SiO_2$: 4 $H_2O$, where SDA-OH is 1-ethyl-4-(pyrrolidin-1-yl)pyridinium hydroxide, was prepared according to the following procedure. 3.21 g Ultrasil VN3PM, 22.86 g of a 22.22 wt. % aqueous solution of 1-ethyl-4-(pyrrolidin-1-yl)pyridinium hydroxide, and 0.80 g of 27.8 wt. % aqueous solution of aluminum sulfate were combined and stirred for 15 minutes. 2.96 g of a 30 wt. % aqueous solution of ammonium fluoride was then added, followed by 0.16 g of EMM-17 seeds. The resulting gel was stirred and left to evaporate to the desired water ratio. The evaporated gel was then transferred to a 23 ml Teflon lined autoclave and reacted in a tumbling (30-40 rpm) oven at 160° C. for 7 days. The resulting product was recovered by filtration, washed thoroughly with deionized water, and then dried at 100° C. in an oven. Phase analysis by powder X-ray diffraction showed the synthesized product to be EMM-17. The $SiO_2/Al_2O_3$ of the product was measured to be 76.

The EMM-17 product was mixed with Versal 300 alumina (65 wt. % zeolite/35 wt. % alumina) and water to a solids levels of 50 wt. %. The resultant mixture was extruded on a 1" Diamond America extruder and then dried at 250° F. (121° C.) overnight in a Despatch forced draft oven. The dried extrudate was calcined in nitrogen at 1000° F. (538° C.) for 3 hours, exchanged with 50 cc/g of 1 M $NH_4NO_3$ for 1 hour in a recirculation mode after which the exchange solution was refreshed and the exchange repeated a second time. The sample was washed overnight with water and dried at 250° F. (121° C.) for 24 hours. The extrudate was calcined in 5 volumes of air/volume of catalyst at 1020° F. (549° C.) for 4 hours to produce the acid form of the molecular sieve. The extrudate was then impregnated with platinum tetraamine nitrate to achieve a 0.6 wt. % Pt loading, equilibrated at ambient conditions, dried at 250° F. (121° C.) for 16 hours, and calcined in air at 680° F. (360° C.) for 3 hours to produce the platinum oxide version of the catalyst. The catalyst was then reduced in the unit used for catalytic testing to produce the active metal catalyst.

Example 3: Decane Isomerization Comparison

Figure 2:
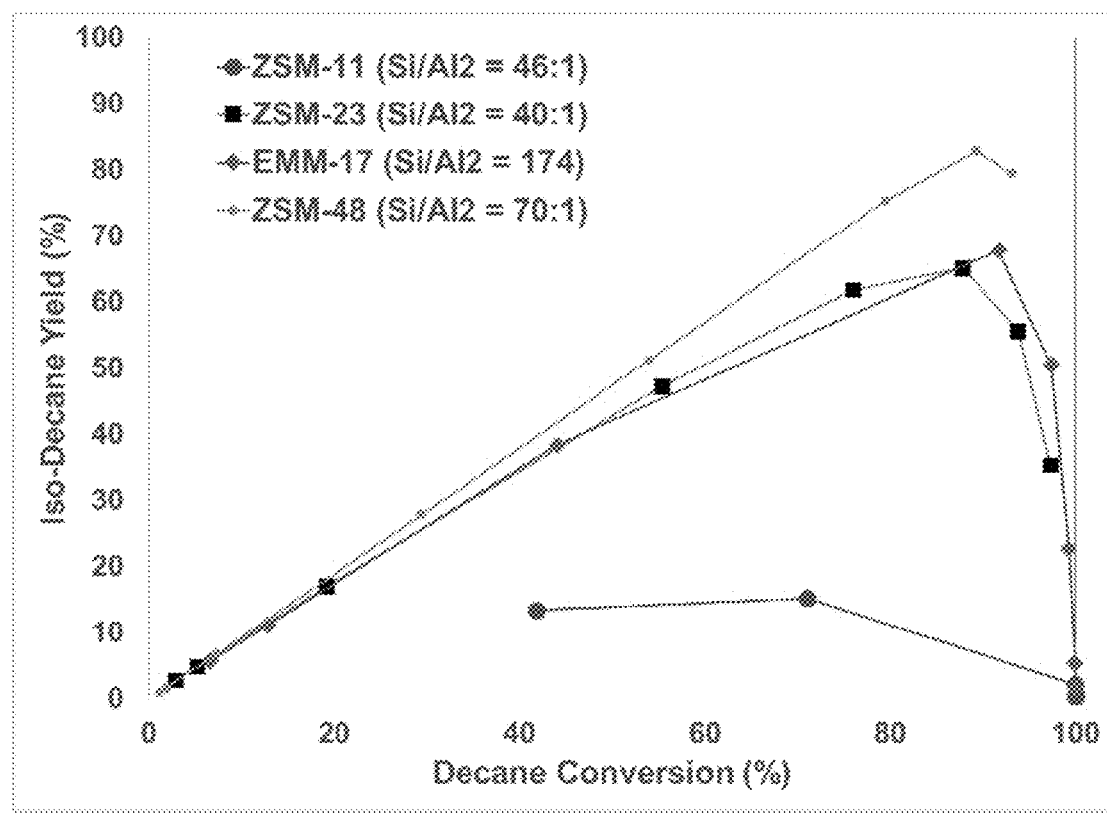
FIG. 2 is a line graph of n-decane conversion against iso-decane yield for the EMM-17 and known dewaxing catalysts employed in Example 3.

EMM-17 was initially screened alongside other traditional and non-traditional dewaxing catalysts for decane isomerization. Historically, decane isomerization has been a leading indicator of good performance for both distillate and lube dewaxing, with n-decane conversion indicative of the overall activity potential of a catalyst and yield of isomerized decane products providing an indication of catalyst selectivity. A comparison of the decane isomerization performance of the EMM-17 (Si/$Al_2$ 164:1) catalyst of Example 1 against other established dewaxing catalysts is shown in FIGS. 1 and 2 below. In each case, the catalysts were formulated at a 65:35 ratio with V300 alumina binder with 0.6 wt. % Pt on each to focus on the impact of the different zeolites in question.

As can be seen from FIG. 1, EMM-17 exhibits similar activity to known highly active but non-selective catalysts, such as zeolite beta and ZSM-11, and is significantly more active than ZSM-48. Referring to the iso-decane yields plotted in FIG. 2, EMM-17 is clearly more selective than zeolite beta and ZSM-11. The lack of available data in the 60% and 97% conversion range makes it difficult to reach a definitive conclusion from FIG. 2 alone as to the relative selectivities of EMM-17 and ZSM-48.

Example 4: Sweet Service Distillate Dewaxing Evaluation

The EMM-17 catalyst (Si/Al$_2$ 164:1) of Example 1 and an equivalent ZSM-48 composition were evaluated for sweet service hydroisomerization of a diesel range feed in a high-throughput pilot plant. Each catalyst was first sized on a 14/25 mesh basis and then loaded on an equivalent volume basis with a target volume of 1.5 mL. After loading, the catalysts were first dried in nitrogen and then reduced in H$_2$ for 4 hours at 320° F. (160° C.). After reducing the catalysts, the relative performance of the catalysts was determined using a hydroprocessed distillate product having the properties listed in Table 3 below.

TABLE 3

| | | |
|---|---|---|
| API Gravity | | 32.52 |
| Specific Gravity | g/cm$^3$ | 0.8627 |
| Hydrogen | wt. % | 12.84 |
| Sulfur | wt. % | 0.00105 |
| Nitrogen | ppm | 0.3 |
| Cloud Point | ° C. | |
| ISL | | −5.7 |
| Phase Tec | | −4.9 |
| Manual | | −1 |
| Simulated Distillation | ° F. | |
| 0.5% Off | | 257 |
| 5% | | 361 |
| 10% | | 400 |
| 20% | | 448 |
| 30% | | 487 |
| 40% | | 525 |
| 50% | | 549 |
| 60% | | 578 |
| 70% | | 609 |
| 80% | | 645 |
| 90% | | 683 |
| 95% | | 706 |
| 99.5% | | 757 |
| Pct. Off at 350° F. | | 4.15 |

All tests were conducted at a liquid hourly space velocity of 3.5 hr$^{-1}$, a pressure of 1000 psig (6996 kPa) H$_2$, 1500 scf/bbl (267 Nm$^3$/m$^3$) hydrogen to feed ratio. Temperatures were adjusted from 500° F. (260° C.) to 550° F. (288° C.). A comparison of the relative dewaxing activity of each of these catalysts can be seen in FIG. 3. It is important to note that the measured delta clouds of the EMM-17 catalyst were off the scale at 550° F. and thus not included in FIG. 3, whereas there was no visible activity for ZSM-48 catalyst at 500° F.

Figure 3:
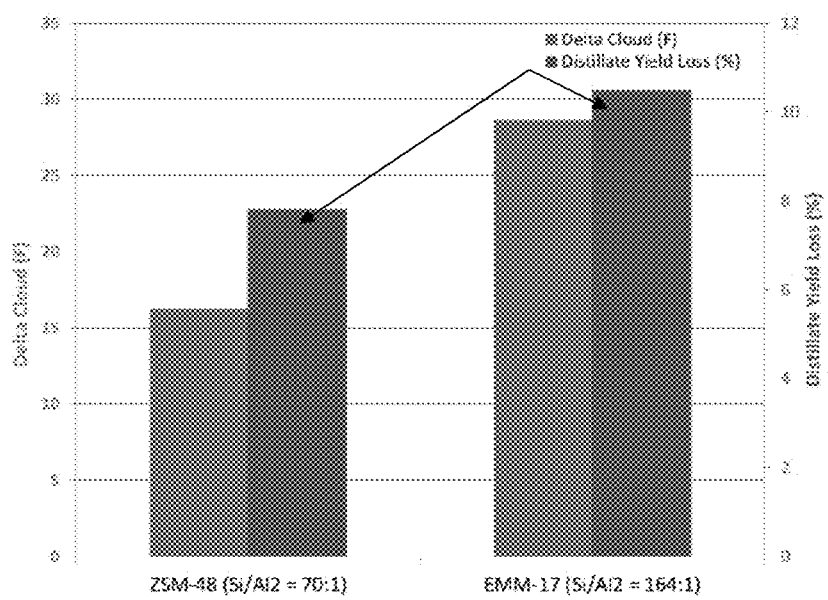
FIG. 3 is a bar graph comparing the decrease in cloud point and the distillate yield loss for the EMM-17 and ZSM-48 catalysts in the hydroisomerization of the distillate feed in Example 4.

As evident from FIG. 3, the EMM-17 based catalyst is significantly more active than the ZSM-48 comparative. When used to treat the distillate feed of Table 1 at a space velocity of 3.5 hr$^{-1}$, a pressure of 1000 psig H$_2$, 1500 scf/bbl hydrogen to feed ratio, and a temperature of 500° F., the EMM-17 catalyst was capable of about 6° F. $\Delta C_p$ and was off the scale (<−100° F. TLP cloud point reduction) at 550° F. In comparison, the ZSM-48 comparative catalyst was not active at 500° F. and was capable of ~12.5° F. $\Delta C_p$ at 550° F. This represents ~+30° F. higher activity for EMM-17 than ZSM-48. Comparing yields is difficult with the limited data in this Example but it seems reasonable to conclude that this version of EMM-17 (Si/Al$_2$=164, unsteamed) has more distillate yield loss at ~2-3% at a delta cloud of 5-10 $\Delta C_p$. As will be seen in the sour service comparison in the next Example, this yield loss can be reduced by lowering the acidity of the EMM-17 based catalyst through raising the Si:Al$_2$ ratio or potentially steaming the material in addition to other methods.

Example 5: Sour Service Distillate Dewaxing Evaluation

Both EMM-17 catalysts of Example 1 and the known dewaxing catalysts listed below:
(a) 0.6 wt. % Pt on ZSM-48 (Si/Al$_2$=70) (65:35 w/V300)
(b) 0.6 wt. % Pt on ZSM-11 (Si/Al$_2$=46) (65:35 w/V300)
in Table 2 were evaluated for sour service hydroisomerization (dewaxing) of a diesel range feed in a pilot plant in a configuration such that all materials were tested in parallel on the same feed at the same operating conditions. Catalysts were first sized on a 14/25 mesh basis and then loaded into a U-shaped tubular reactor on an equivalent volume basis with a target volume of 1.5 mL.

After loading, the catalysts were first dried in nitrogen and reduced in H$_2$ for 4 hours at 320° F. (160° C.). After the completion of the reduction step the catalysts were ready for testing.

The relative performance of the catalysts was determined using a hydroprocessed distillate product having the properties listed in Table 4 below. In order to simulate a sour environment downstream from a hydrotreating catalyst the feed was spiked with dimethyl disulfide (DMDS) and tert-butyl amine. These are common additives which decompose readily to H$_2$S and NH$_3$ at the operating conditions run throughout this experiment.

TABLE 4

| | | |
|---|---|---|
| API Gravity | | 32.29 |
| Specific Gravity | g/cm$^3$ | 0.8639 |
| Hydrogen | wt. % | 12.77 |
| Sulfur | wt. % | 1.42 |
| Nitrogen | Ppm | 435 |
| Cloud Point | ° C. | |
| ISL | | −5.0 |
| Phase Tec | | −5.4 |
| Manual | | −3 |
| Simulated Distillation | ° F. | |
| 0.5% Off | | 235 |
| 5% | | 358 |
| 10% | | 398 |
| 20% | | 446 |
| 30% | | 485 |
| 40% | | 523 |
| 50% | | 548 |
| 60% | | 577 |
| 70% | | 608 |
| 80% | | 644 |
| 90% | | 683 |
| 95% | | 706 |
| 99.5% | | 758 |
| Pct. Off at 350° F. | | 4.43 |

All tests were conducted at a liquid hourly space velocity of 3.5 hr$^{-1}$, a pressure of 1000 psig (6996 kPa) H$_2$, 1500 scf/bbl (267 Nm³/m³) hydrogen to feed ratio. Temperatures were adjusted from 650° F. (343° C.) to 710° F. (377° C.). A comparison of the relative dewaxing activity of each of these catalysts as a function of temperature and the distillate yield loss as a function of decrease in cloud point (delta cloud) can be seen in FIGS. 4 and 5. It is important to note that the measured delta clouds obtained with both EMM-17 catalysts and the ZSM-11 based material were off the scale at 710° F. (377° C.) and were thus not included in the Figures.

Figure 4:
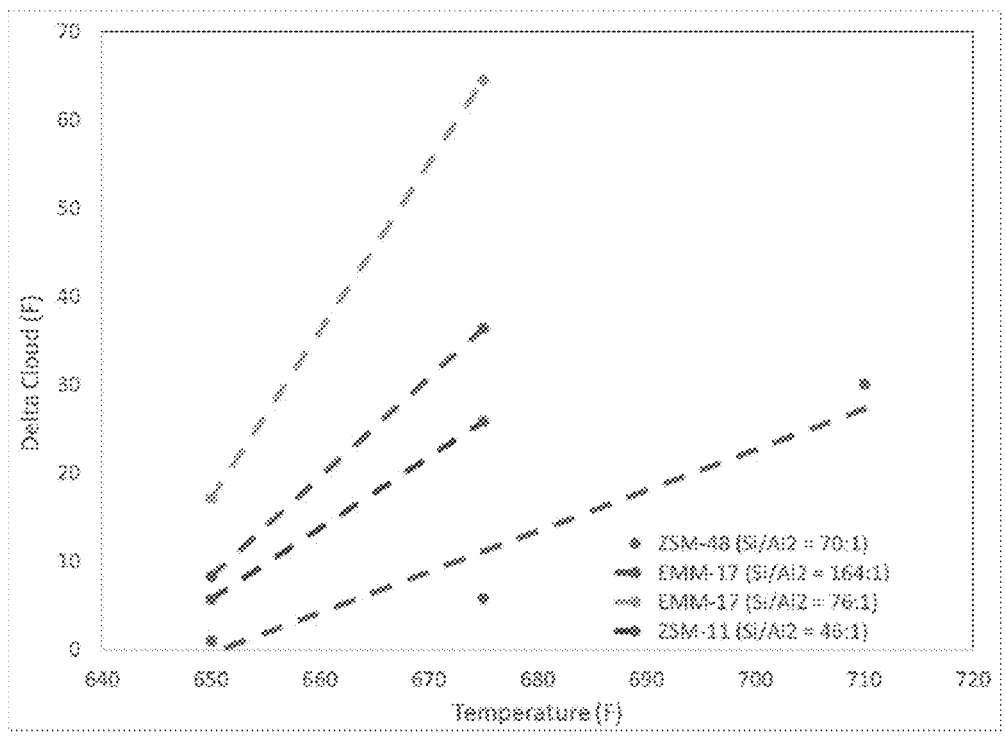
FIG. 4 is a graph plotting the decrease in cloud point (delta cloud) against dewaxing temperature for the various catalysts employed in the dewaxing test of Example 5.
Figure 5:
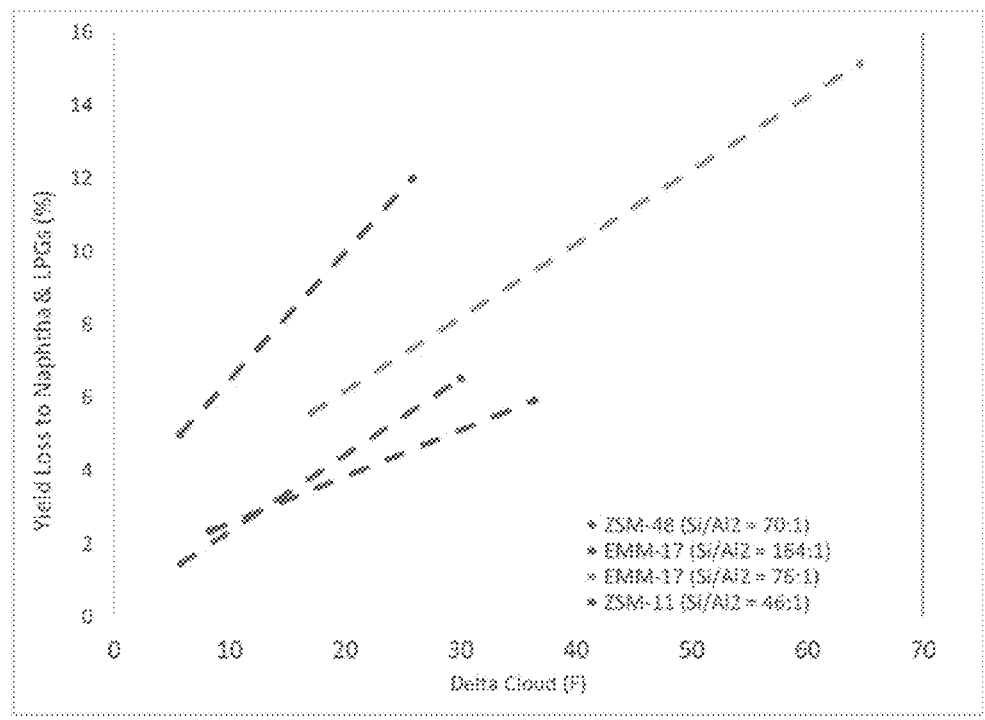
FIG. 5 is a graph plotting distillate yield loss against delta cloud for the various catalysts employed in the dewaxing test of Example 5.

As can be seen in FIGS. 4 and 5, EMM-17 catalysts at both silicon to aluminum ratios investigated exhibit significantly higher activity than the ZSM-48 comparative. Comparing the temperatures required to achieve ~15° F. delta cloud, the activity benefit of EMM-17 ranges from ~25° F. for a 164:1 Si:Al$_2$ ratio to a ~45° F. activity benefit at a Si:Al$_2$ ratio of 76:1. EMM-17 even has more activity than ZSM-11 at these ratios, which is a high activity, non-selective dewaxing catalyst. Looking at selectivity, EMM-17 exhibits significantly lower distillate yield loss than ZSM-11 despite showing higher activity. Comparing the selectivity to ZSM-48, EMM-17 with higher Si:Al$_2$ ratio exhibits similar yield loss to ZSM-48 while EMM-17 with lower Si:Al$_2$ ratio exhibits higher overall yield loss (~+1.5% at equivalent cloud). However the application may tolerate the yield loss for the gain in activity. This demonstrated activity and yield performance differences between these two materials shows the potential of tuning these catalysts to fit specific needs of the application. Lowering the overall acidity of the material seems to have a significant impact on the yield loss with these materials.

Example 6: EMM-17 Performance on Slack Wax

The EMM-17 catalyst of Example 1 was evaluated for lube dewaxing of slack wax. Comparison tests were conducted with a catalyst comprising 0.6% Pt on steamed ZSM-48 (Si/Al$_2$=70:1) composited with Versal 300 alumina (65 wt. % zeolite/35 wt. % alumina).

The catalysts were loaded into the test reactor on an equivalent volume basis with a target volume of 10 mL. After loading, the catalysts were first dried in nitrogen at a flow rate of 5 SLPH at 300° F. (149° C.) and held for 2 hours. Each catalyst was then reduced in H$_2$ at a flow of 5 SLPH, a pressure of 200 psig (1480 kPa-g) H$_2$ and held for 8 hours at 500° F. (260° C.). After the completion of the reduction step the catalysts were ready for testing. The relative performance of the catalysts was determined using a commercial refinery bottoms feed having the properties listed in Table 5.

TABLE 5

| Specific Gravity | g/cm³ | 0.8574 |
|---|---|---|
| Sulfur | mg/kg | 36.9 |
| Nitrogen | ppm | <10 |
| Viscosity | | |
| K Visc @ 60 C. | mm²/s | 14.88 |
| K Visc @ 100 C. | mm²/s | 5.4737 |
| Visc Index | | 116.8 |
| Simulated Distillation | ° C. | |
| 0.5% Off | | 276 |
| 5% | | 341.8 |
| 10% | | 366.3 |
| 20% | | 391.4 |
| 30% | | 407.8 |
| 40% | | 420.1 |

TABLE 5-continued

| 50% | 430.6 |
|---|---|
| 60% | 442.1 |
| 70% | 454.2 |
| 80% | 467.5 |
| 90% | 487.9 |
| 95% | 503.9 |
| 99.50% | 540.3 |

All tests were conducted at a liquid hourly space velocity of 1.0 hr$^{-1}$, a pressure of 2000 psig (13891 kPa-a) H$_2$, 2000 scf/bbl (356 Nm³/m³) hydrogen to feed ratio. Temperatures were adjusted from 575° F. (302° C.) to 625° F. (329° C.). A comparison of the relative dewaxing activity of each of these catalysts as a function of temperature and yield loss can be seen in FIGS. 6 and 7.

Figure 6:
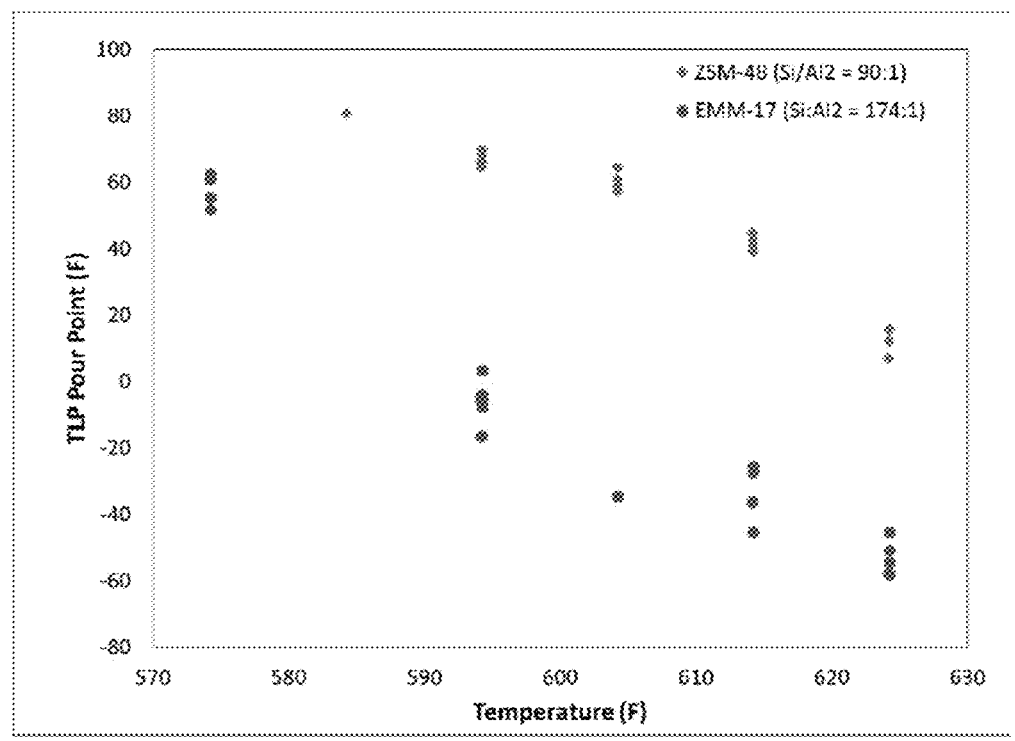
FIG. 6 is a graph of product pour point against dewaxing temperature for the various catalysts employed in the dewaxing test of Example 6.
Figure 7:
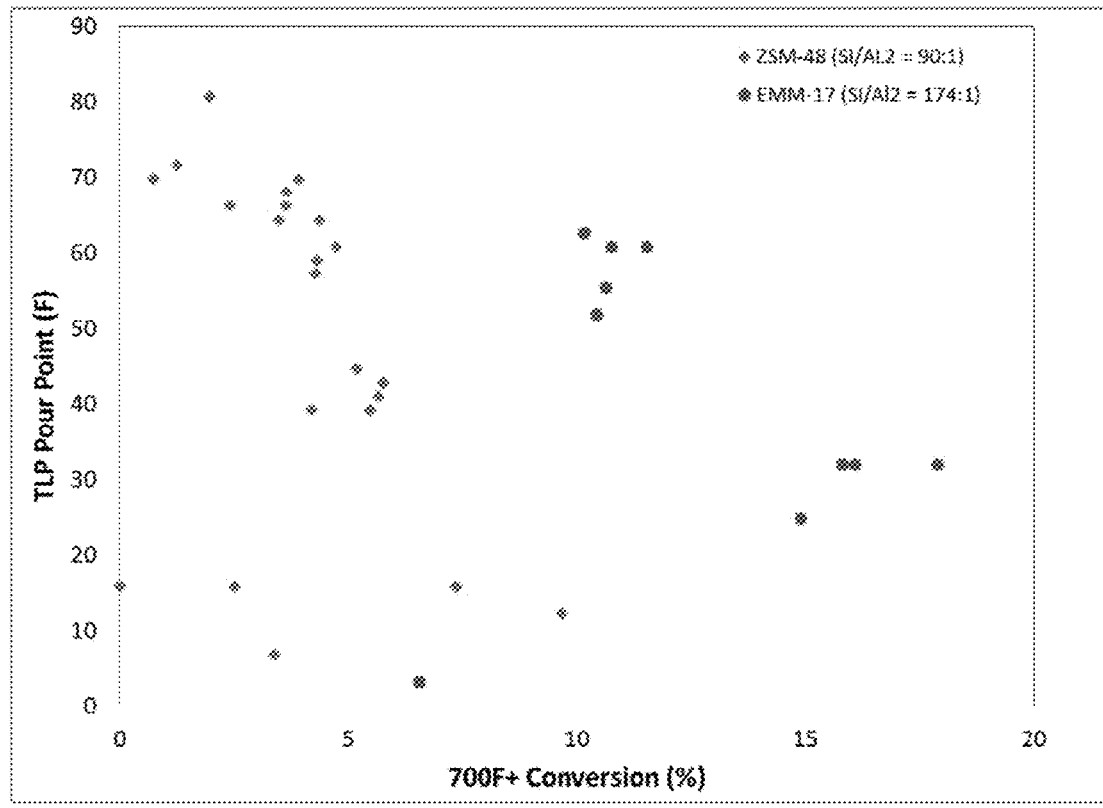
FIG. 7 is a graph of product pour point against 700° F.+(371° C.+) conversion for the various catalysts employed in the dewaxing test of Example 6.

As can be seen FIGS. 6 and 7, the EMM-17 catalyst exhibits significantly higher activity than ZSM-48. Comparing the temperatures required to achieve similar product pour, the activity benefit of EMM-17 ranges from ~20-40° F. for the 87 Si:Al ratio version. Looking at selectivity, EMM-17 exhibits higher yield loss as reflected by its higher 700° F. conversion at equivalent product pour. However, it is expected that optimization of catalyst activity and selectivity can be achieved by conventional methods including: steaming, zeolite to binder ratio, different silica to alumina ratios on EMM-17.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

The invention claimed is:

1. A process for improving the cold flow properties of a hydrocarbon feedstock, the process comprising:
   contacting a feedstock comprising a sulfur content of greater than 10 ppm by weight and a nitrogen content of greater than 10 ppm by weight with a catalyst composition comprising an EMM-17 molecular sieve and a hydrogenation component under dewaxing conditions effective to produce a dewaxed product having a cloud point and/or pour point that is reduced relative to the cloud point and/or pour point of the feedstock by at least 5° C.

2. The process of claim 1, wherein the hydrocarbon feedstock comprises a distillate fraction having an initial boiling point of at least 95° C. and a final boiling point 455° C. or less.

3. The process of claim 1, wherein the hydrocarbon feedstock comprises a lubricant basestock having an initial boiling point of at least 220° C. and a final boiling point up to 650° C.

4. The process of claim 1, wherein the hydrocarbon feedstock comprises up to 2.0 wt. % sulfur and up to 500 ppm by weight nitrogen.

5. The process of claim 1, wherein the dewaxing conditions comprise a temperature of from 200 to 450° C., a hydrogen partial pressure of from 1.4 MPag to 34.6 MPag (200 psig to 5000 psig), and a hydrogen treat gas to feed rate of from 35.6 m³/m³ (200 SCF/B) to 1781 m³/m³ (10,000 scf/B).

6. The process of claim 1, wherein the dewaxing conditions comprise a temperature of from 270 to 400° C., a hydrogen partial pressure of from 4.8 MPag to 20.7 MPag, and a hydrogen treat gas to feed rate of from 178 m³/m³ (1000 SCF/B) to 890.6 m³/m³ (5000 SCF/B).

7. The process of claim 1, wherein the EMM-17 molecular sieve comprises an aluminosilicate.

8. The process of claim 7 wherein the molecular sieve has a silica to alumina molar ratio of at least 50.

9. The process of claim 7, wherein the catalyst is steamed prior to the contacting to reduce the framework aluminum content of the molecular sieve.

10. The process of claim 1, wherein the hydrogenation component comprises at least one metal or compound thereof from Groups 6 to 12 of the Periodic Table of the Elements.

11. The process of claim 1, wherein the dewaxing catalyst comprises from 5 to 80 wt. % of the hydrogenation component.

12. The process of claim 1, wherein the dewaxing catalyst further comprises at least 5% by weight of a binder.

13. A process for improving the cold flow properties of a hydrocarbon feedstock, the process comprising:
   (a) contacting the feedstock with a first hydrotreating catalyst composition under conditions effective to reduce at least one of the sulfur, nitrogen or aromatic content of the feedstock and produce a hydrotreated product comprising no more than 10 ppm by weight of nitrogen and no more than 10 ppm by weight of sulfur; and
   (b) contacting the hydrotreated product with a second catalyst composition different from the first catalyst composition and comprising an EMM-17 molecular sieve and a hydrogenation component under dewaxing conditions effective to produce a dewaxed product having a cloud point and/or pour point that is reduced relative to the cloud point and/or pour point of the feedstock by at least 5° C.

14. The process of claim 13, wherein the first hydrotreating catalyst composition comprises a metal or compound thereof from Groups 6 and 8 to 10 of the Periodic Table on a refractory metal oxide support.

15. The process of claim 13, wherein the contacting steps (a) and (b) are conducted in a single reactor.

16. The process of claim 13, wherein the contacting steps (a) and (b) are conducted in separate reactors.

17. The process of claim 13, wherein the dewaxing conditions comprise a temperature of from 200 to 450° C., a hydrogen partial pressure of from 1.4 MPag to 34.6 MPag (200 psig to 5000 psig), and a hydrogen treat gas to feed rate of from 35.6 m³/m³ (200 SCF/B) to 1781 m³/m³ (10,000 scf/B).

18. The process of claim 13, wherein the metal hydrogenation component comprises Pt, Pd, or a combination thereof.

* * * * *